(12) United States Patent
Parkinson et al.

(10) Patent No.: US 11,654,647 B2
(45) Date of Patent: May 23, 2023

(54) FABRICATION OF THREE-DIMENSIONAL COMPOSITE STRUCTURES

(71) Applicant: Cytec Industries Inc., Princeton, NJ (US)

(72) Inventors: Robert Parkinson, Wrexham (GB); Johannes Wolf Georg Treiber, Lauingen/Donau (DE); Sebastien Luc Greber, Brynteg (GB)

(73) Assignee: CYTEC INDUSTRIES INC., Princeton, NJ (US)

( * ) Notice: Subject to any disclaimer, the term of this patent is extended or adjusted under 35 U.S.C. 154(b) by 487 days.

(21) Appl. No.: 16/299,767

(22) Filed: Mar. 12, 2019

(65) Prior Publication Data

US 2019/0275750 A1    Sep. 12, 2019

Related U.S. Application Data (60) Provisional application No. 62/641,648, filed on Mar. 12, 2018.

(51) Int. Cl.
| | |
|---|---|
| B29C 70/38 | (2006.01) |
| B29D 99/00 | (2010.01) |
| B29C 70/24 | (2006.01) |
| B29B 11/16 | (2006.01) |
| B32B 3/28 | (2006.01) |

(52) U.S. Cl.
CPC .......... *B29D 99/0003* (2013.01); *B29B 11/16* (2013.01); *B29C 70/24* (2013.01); *B29C 70/38* (2013.01); *B29C 70/386* (2013.01); *B29D 99/0007* (2013.01); *B32B 3/28* (2013.01)

(58) Field of Classification Search
CPC ........ B29D 99/0007; B32B 3/28; B29C 70/86
See application file for complete search history.

(56) References Cited

U.S. PATENT DOCUMENTS

| | | |
|---|---|---|
| 4,696,707 A | 9/1987 | Lewis et al. |
| 5,041,179 A | 8/1991 | Shinno et al. |
| 7,138,167 B2 | 11/2006 | Sakonjo et al. |
| 7,818,945 B2 | 10/2010 | Gregg et al. |
| 7,842,145 B2 | 11/2010 | Hogg |
| 7,943,076 B1 | 5/2011 | Hawkins et al. |
| 8,709,576 B2 | 4/2014 | Kubryk et al. |
| 8,715,561 B2 | 5/2014 | Levers et al. |
| 8,932,423 B2 | 1/2015 | McCarville et al. |
| 9,440,401 B1 | 9/2016 | Nelson |

(Continued)

FOREIGN PATENT DOCUMENTS

| | | |
|---|---|---|
| EP | 1946913 A1 | 7/2008 |
| WO | 9915323 A1 | 4/1999 |
| WO | 2012046020 A1 | 4/2012 |

*Primary Examiner* — Scott W Dodds
(74) *Attorney, Agent, or Firm* — Thi Dang (57) ABSTRACT

A method for the manufacturing of three-dimensional (3D) preforms and composite structures having non-planar surfaces and flanges such that the fibrous or composite material used for shaping the final 3D structure has the necessary length and surface area to conform to the desired contours of the molding tool without wrinkling. The manufacturing method begins with the formation of an intermediate preform blank by automated placement of fiber tapes or prepreg tapes, followed by shaping the blank on a molding tool with 3D contours to form the final 3D structure.

4 Claims, 6 Drawing Sheets

(56) References Cited

U.S. PATENT DOCUMENTS

| | | |
|---|---|---|
| 9,701,067 B2 | 7/2017 | Hawkins et al. |
| 2006/0252334 A1* | 11/2006 | LoFaro ............... C08J 5/046 442/400 |
| 2011/0127698 A1 | 6/2011 | Alenby et al. |
| 2012/0247643 A1* | 10/2012 | Kramp ............... B29C 70/30 156/64 |
| 2016/0121557 A1 | 5/2016 | Munaux |
| 2017/0297317 A1 | 10/2017 | Chapman et al. |

* cited by examiner

FABRICATION OF THREE-DIMENSIONAL COMPOSITE STRUCTURES

The instant application claims the benefit of prior U.S. Provisional Application No. 62/641,648 filed on Mar. 12, 2018, the content of which is incorporated herein by reference in its entirety.

The present disclosure relates generally to the manufacturing of fiber-reinforced composite parts.

DETAILED DESCRIPTION

The use of fiber-reinforced composite materials has become more prevalent in the aerospace and automotive industries. These composite materials contain reinforcement fibers embedded in a polymer matrix. Their light-weight property is particularly advantageous when compared to similar parts constructed from metals. Three-dimensional composite parts can be manufactured using different methods, one of which is liquid resin infusion. Resin Transfer Molding (RTM) and Vacuum Assisted Resin Transfer Molding (VARTM) are examples of manufacturing processes that involve injecting or infusing a liquid resin into a fibrous preform. The fibrous preform is porous enough to allow the resin to infuse or impregnate it completely during the resin infusion operation. Exemplary applications of such methods include aircraft wing skins and fuselages.

During the RTM process, the fibrous preform is placed into an enclosed mold cavity, and the resin is injected into the cavity under pressure. The mold with the preform is often put under vacuum so that the vacuum removes all the air in the preform reducing porosity and speeds up the RTM process. Once the liquid resin fills the mold cavity, the resin is cured, resulting in the formation of a composite part. VARTM is similar to RTM except that a single-sided tool is normally used with vacuum bagging, and vacuum pulls the liquid resin into the preform. These techniques are well suited for the manufacturing of structural parts with very complex shapes.

To form a 3-dimensional (3D) composite part via RTM or VARTM, the layup of the preform is an important element in the fabrication process. The preform is in essence the structural part awaiting resin. For certain aircraft parts, an intermediate preform blank, usually a flat preform blank, is formed prior to shaping the preform into a final 3D geometry. The intermediate preform blank is a layup of fibrous layers assembled in a stacking sequence. An automated placement method such as Automated Tape Laying (ATL) or Automated Fiber Placement (AFP) has been used to build up, layer by layer, a preform blank of desired thickness. The ATL/AFP process involves automatically dispensing a plurality of narrow-width strips of fibrous material ("fiber tapes"), side by side, onto a tool surface to create a layer of large dimensions, referred to as a "ply". Additional plies are sequentially built onto the previously disposed ply to produce a layup with a desired thickness. The fiber tapes are not fully impregnated with a resin or embedded in a resin matrix. As such, the resulting preform composed of fiber tapes remains porous and permeable to liquid, particularly liquid resin that is used for RTM and VARTM.

In a typical ATL/AFP operation, a placement head makes repeated passages over a tool surface to lay down multiple fiber tapes, side by side, in a defined pattern until a first ply of desired dimensions is formed. During each passage, the fiber placement head dispenses (or deposits) one or more continuous tapes from the supply creel(s) onto the tool surface while the placement head moves relative to the tool surface. The length of the continuous fiber tape(s) is/are cut at the end of each passage. During the formation of the first ply, a compaction roller presses the tapes against the tool surface. Subsequent plies of fiber tapes are built up, layer by layer, by continued passages of the placement head over the prior laid ply. The compaction roller presses the subsequently laid tapes against the previously laid tapes to compact, i.e. consolidate, the superimposed tapes. The compaction roller may comprise a cylindrical body made of a flexible material, which is elastically deformable by compression. For example, the cylindrical body may be composed of a non-expanded or expanded elastomeric material, such as silicone, polysiloxane or polyurethane.

Each ply may be composed of parallel fiber tapes of unidirectional fibers. In a preform blank, the unidirectional fibers in each ply may be oriented at a selected angle $\theta$, such as 0°, 45°, or 90°, with respect to the length of the preform blank. The unidirectional fibers in each ply may be oriented at a different angle relative to the adjacent ply or plies depending on the structural properties desired for the final composite part.

The manufacturing of 3D preforms having non-planar surfaces and flanges is problematic as at the point(s) where the surface goes out of plane, curving either away from or towards the flange, the path of flange edge outer edge will be greater or shorter than the inner edge, therefore need an increased or decreased area of material compared to a flat blank. Without extra length already being in the flanges at the right place the material will have to shear to provide it. The reaction in the main surface to the shear force in the flange can cause wrinkles in the main surface. There is a need to put extra length/area of material into the blank at these points.

The present disclosure provides a method for the manufacturing of three-dimensional (3D) preforms having non-planar surfaces and flanges such that fibrous material used for shaping the final 3D preform has the necessary length and surface area to conform to the desired contours of the mold without wrinkling. The manufacturing method begins with the formation of an intermediate preform blank by ATL or AFP, followed by shaping the blank on a mold with 3D contours to form the final shaped preform. The final shaped preform is configured for receiving liquid resin via RTM or VARTM processes. The blank is mostly flat but for undulations at portions thereof to create the extra length along the side edges and the extra surface area necessary for conforming to the desired contours of a mold without wrinkling in the subsequent shaping step.

Figure 1:
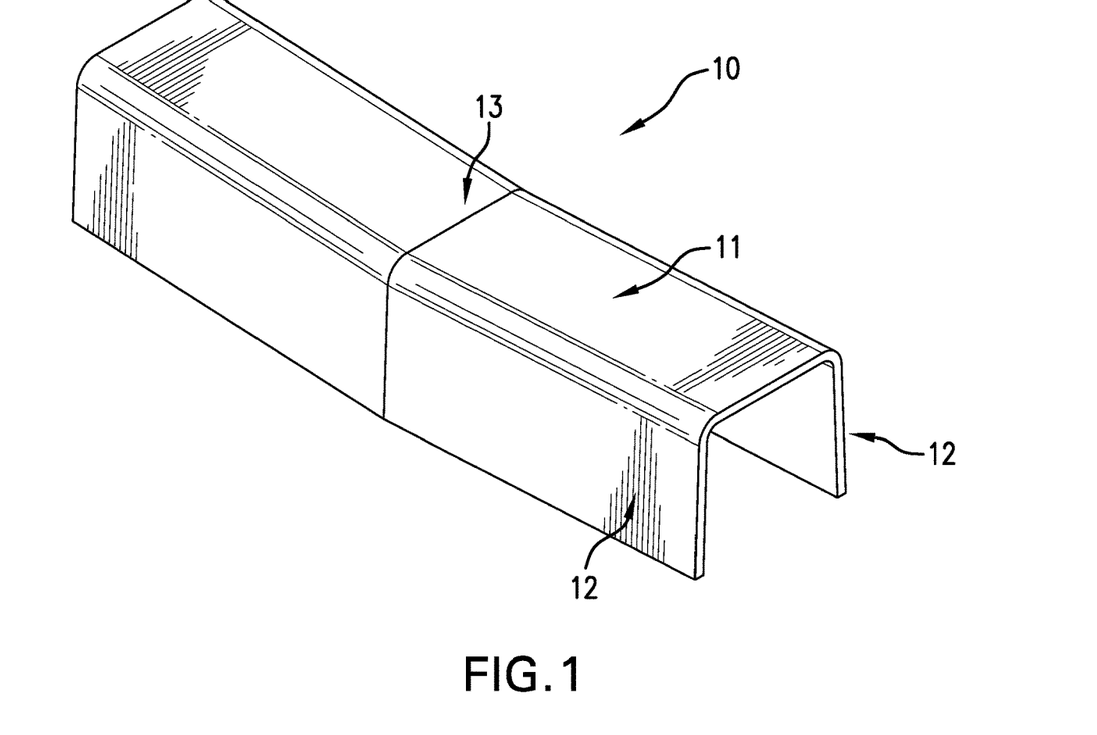
FIG. 1 shows a three-dimensional (3D) preform with side flanges.

As an example, the final 3D preform may have the configuration shown in FIG. 1. The preform 10 in FIG. 1 has a longitudinal length, a non-planar surface 11 extending along the length and two contiguous side flanges 12, forming a substantially U-shaped cross-section. It should be noted that the relative dimensions shown in FIG. 1 is not to scale. For example, the longitudinal length can be 100 times the distance between the side flanges 12. There is no restriction on the length of the preform, which length depends on the composite part being made. In some embodiments, the length may be in the range of 5 m to 40 m. Each flange 12 extends orthogonally from the non-planar surface 11. It should be understood that the flange 12 may form an angle other than 90 degrees with the non-planar surface 11. The non-planar surface 11 has a bent line (or valley) 13, referred herein as "a kink", defined by two sloping surfaces. Each of the sloping surfaces inclines downwardly from one end of the preform toward the middle. The bent line 13 is created where the two sloping surfaces meet. It should be understood that the transition between the two sloping surfaces could be a smooth curve as well as a sharp kink.

Figure 2:
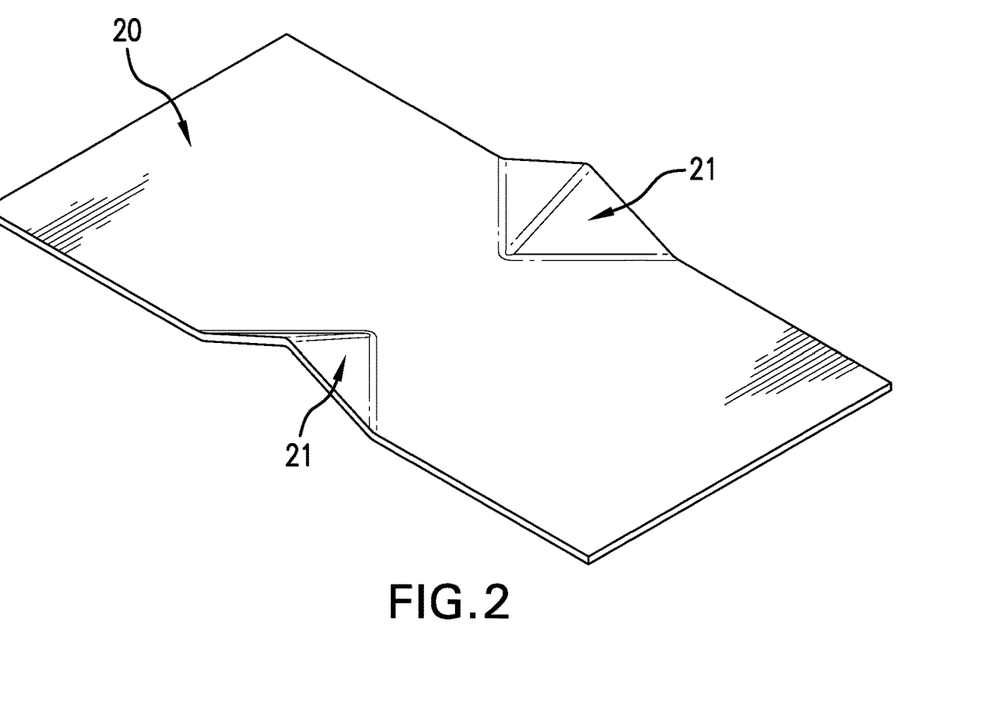
FIG. 2 shows an intermediate preform blank that can be shaped into the 3D preform shown in FIG. 1, according to one embodiment.

The method for manufacturing the 3D preform shown in FIG. 1 begins with the formation of an intermediate preform blank which may have the configuration shown in FIG. 2. Referring to FIG. 2, most of the preform blank 20 is flat but for two undulations 21 at two edge portions of the blank. The undulations 21 are created at the locations that will be adjacent to the "kink" of the final 3D preform shown in FIG. 1. In one embodiment, the curved edge profile of the undulation 21 is two flat ramps (or slopes) with three curved transition regions, one at bottom of each slope and a larger one on the top between the slopes. This type of undulation is also referred herein as a "single-wave" undulation.

Figure 3:
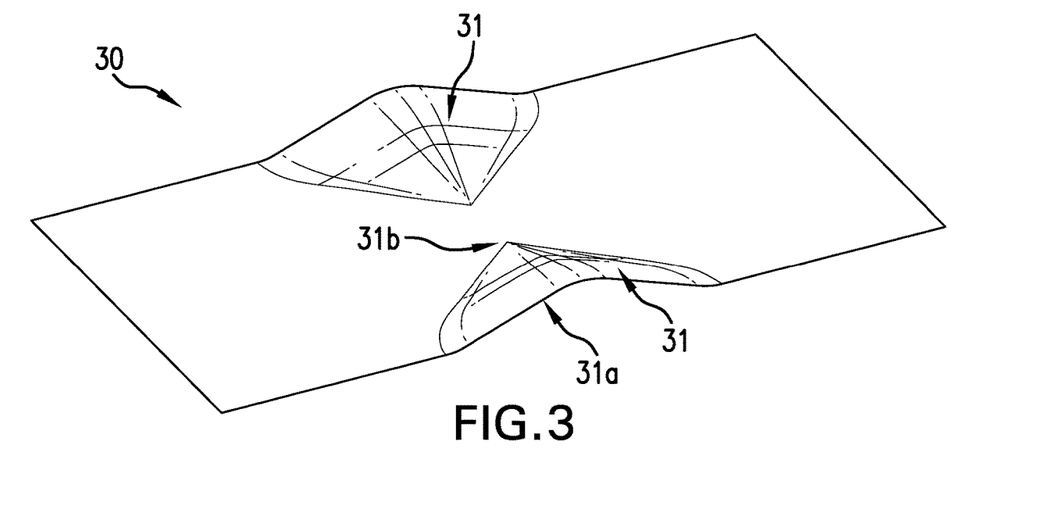
FIG. 3 shows the mold surface for forming the intermediate preform blank shown in FIG. 2.

FIG. 3 shows a mold surface 30 on which the intermediate preform blank 20 of FIG. 2 can be formed. The mold surface 30 is mostly planar but for two tapered ramps 31 protruding from the planar portion. Each tapered ramp 31 tapers smoothly from an undulating edge 31a to an apex 31b. The apexes (apices) 31b are pointing toward each other and are spaced from each other by a distance.

Figure 4:
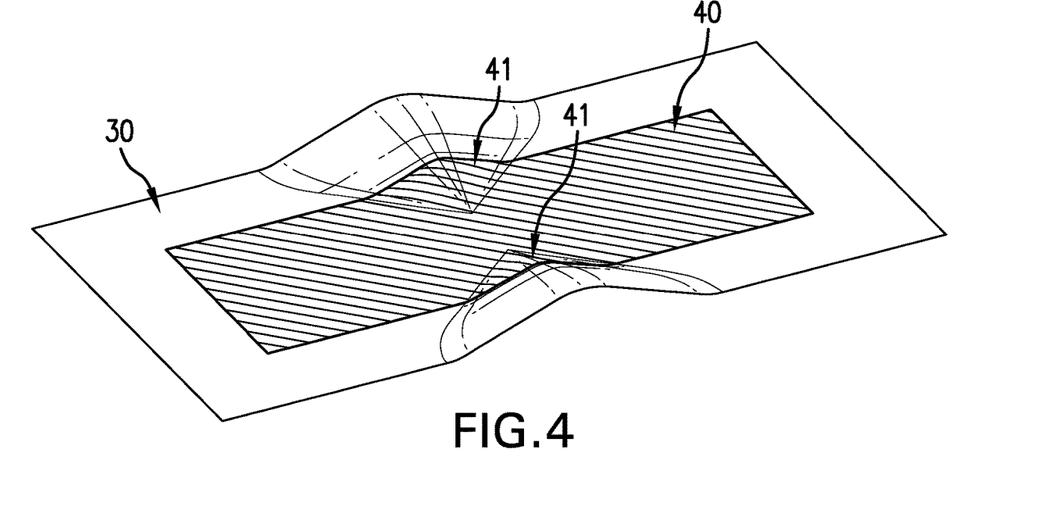
FIG. 4 shows parallel strips of fibrous material deposited on the mold surface of FIG. 3.

FIG. 4 shows a plurality of fiber tapes deposited side-by-side via ATL/AFP on the mold surface 30 so as to form a ply 40 with the desired dimensions (e.g., length and width). The ply 40 conforms to the contours of the mold surface 30 including the tapered ramps, thereby forming the single-wave undulations 41 shown in FIG. 4. Subsequent plies of fiber tapes may be deposited onto ply 40 in the same manner until a preform blank of desired thickness is obtained. The fiber tapes in each ply may be oriented at different angles relative to the length of the preform blank and the fiber tapes in each ply may be oriented at different angles relative to the adjacent ply (or plies).

Figure 5:
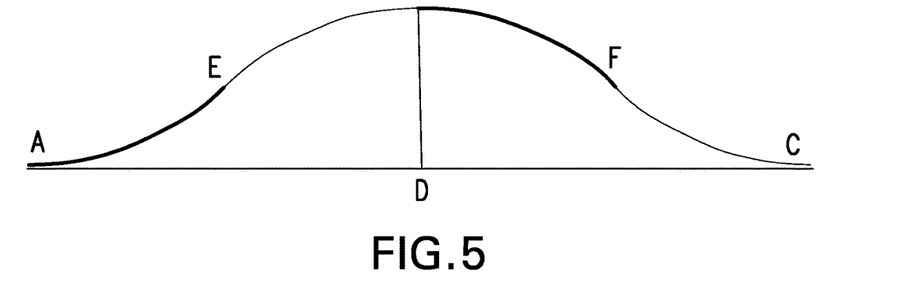
FIG. 5 shows an exemplary curved edge profile.

The curved edge of the single-wave undulation has a length that can be defined by a plurality of segments, some or all of which are curved segments. That is, a combination of curved and straight segments is possible. FIG. 5 illustrates a single-wave curved edge having a length ($L_{curve}$), which can be defined by four curved segments: AE (from point A to point E), EB (from point E to point B), BF (from point B to point F) and FC (from point F to point C). The curved edge has a maximum height $H_{max}$ (from point B to point D). As compared to the straight line distance (AC) from point A to point C, the curved edge creates an extra length A which can be defined as follows:

$$\Delta = AE + EB + BF + FC - AC.$$

If each curved segments is ⅛ of the circumference of a circle, the length $L_{curve}$ may be defined by the following formula:

$$L_{curve} = \frac{\pi H_{max}}{4(\sin 22.5)^2}.$$

Based on the above formula, the curved edge creates an extra length A of approximately 0.5348 of the maximum height $H_{max}$. Curvature of ⅛ circle is described, but other curvatures are possible, for example, the curved segments may have curvature of ⅙, ⅒, 1/12, etc. of a circle. Generally, the wave height can be varied based on other factors such as the width of the flange and the angle of the kink. As examples, the ramp height may be 10 to 100 mm. However, there is no restriction on the wave height since this can be varied depending on the size of preform.

Figure 6:
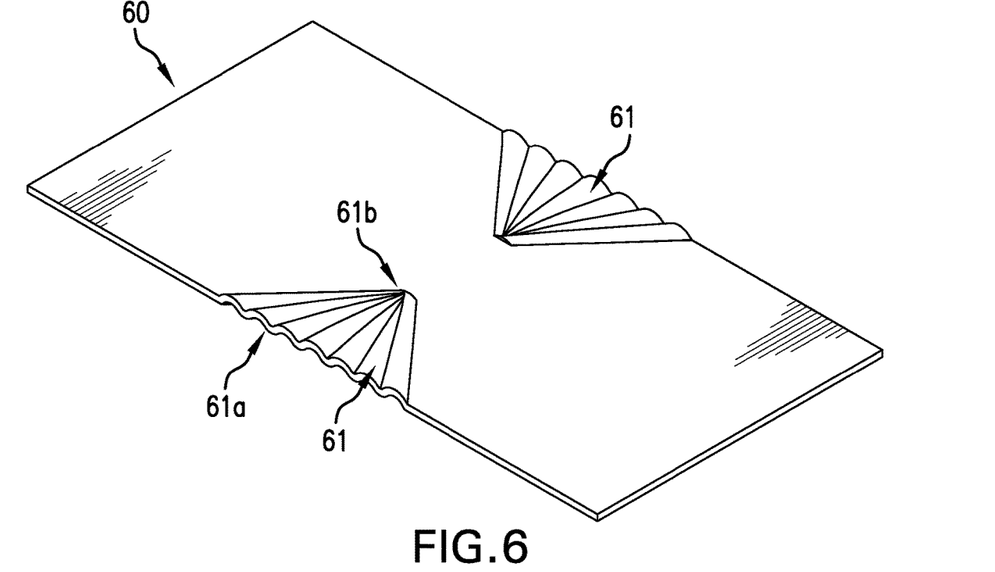
FIG. 6 shows an intermediate preform blank that can be shaped into the 3D preform shown in FIG. 1, according to another embodiment.

FIG. 6 shows an alternative configuration for the intermediate preform blank, which can be subsequently shaped into the final 3D preform shown in FIG. 1. Referring to FIG. 6, the preform blank 60 is mostly flat except for two edge portions, which contain fan-shaped surface undulations 61. The fan-shaped surface undulations 61, referred herein as "multi-wave" undulations, taper from a wavy edge 61a to an apex 61b. For each longitudinal side edge of the blank, only a portion thereof is provided with the wavy edge 61a. The apexes 61b of fan-shaped muti-wave undulations 61 are pointing toward each other and are spaced from each other by a distance. The multi-wave undulations 61, in total, occupy a small portion of the entire preform blank 60. In some embodiments, more than 50% of the blank surface area is planar or flat (without any undulation). In one embodiment, the preform's length is 20 m long and 99% of preform is flat (i.e., without undulations).

Figure 7:
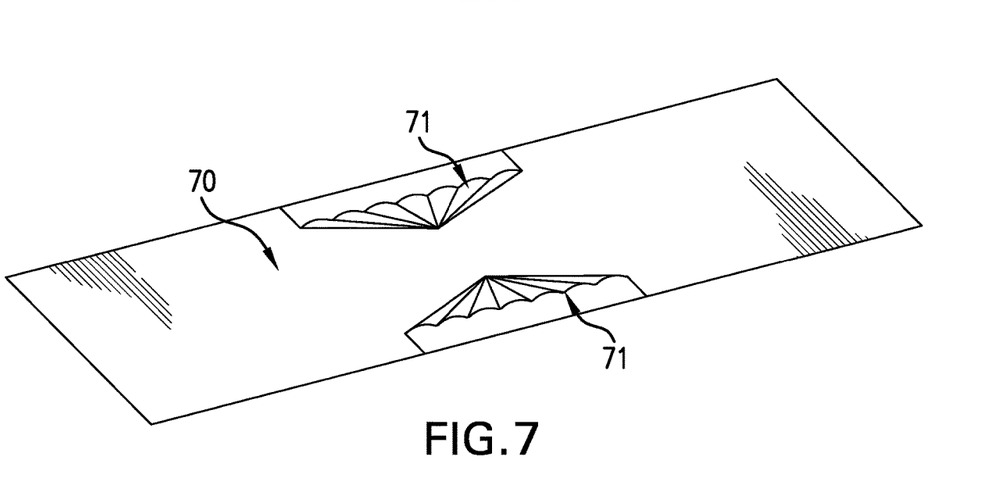
FIG. 7 shows the mold surface for forming the intermediate preform blank shown in FIG. 6.

FIG. 7 shows a mold surface 70 on which the intermediate preform blank 60 shown in FIG. 6 can be formed. The mold surface 70 is provided with spaced apart, fan-shaped multi-wave undulations 71 that taper from a wavy edge to an apex. The multi-wave undulations 71 are composed of a plurality of ridges and valleys. Each ridge tapers smoothly from a single-wave curved edge to a common apex. The preform blank 60 shown in FIG. 6 can be formed on the mold surface 70 in FIG. 7 by depositing a plurality of fiber tapes, side-by-side, via ATL or AFP to form a ply as described with reference to FIG. 4. Subsequent plies of fiber tapes can be sequentially deposited onto the existing ply in the same manner until a preform blank of desired thickness is obtained. The fiber tapes conform to the surface contours of the mold surface and the portions of fiber material that conform to the fan-shaped undulations in the mold surface create multi-wave undulations in the preform blank.

Figure 8:
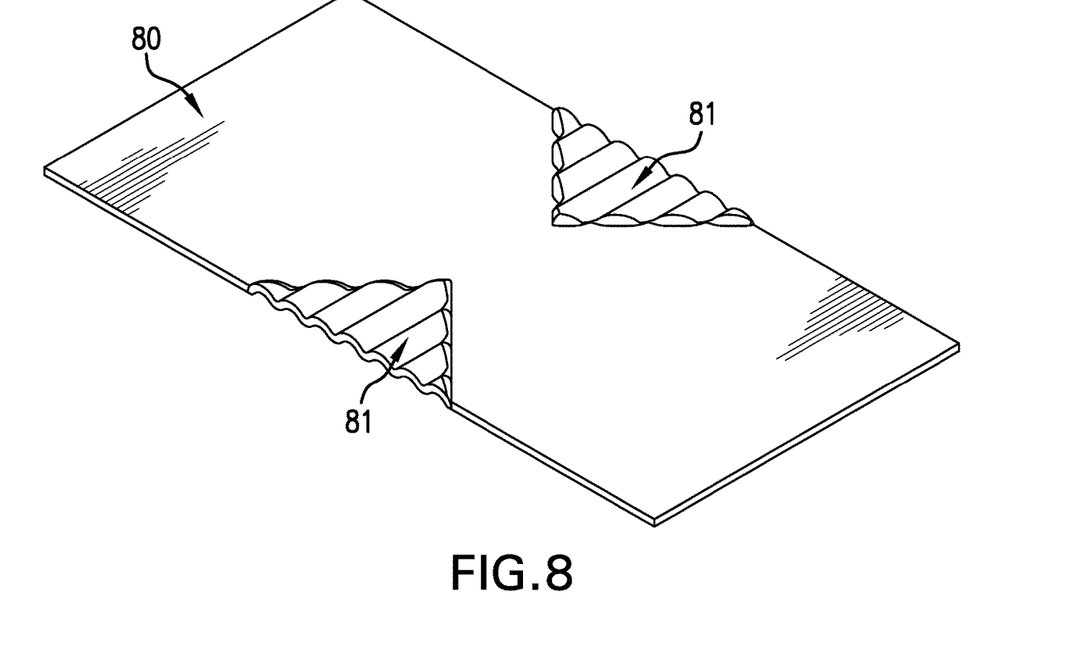
FIG. 8 shows an intermediate preform blank that can be shaped into the 3D preform shown in FIG. 1, according to yet another embodiment.

FIG. 8 shows another configuration for the intermediate preform blank, which can be subsequently shaped into the final 3D preform shown in FIG. 1. As shown in FIG. 8, the preform blank 80 is mostly flat except for two side edge portions which contain multi-wave undulations 81. The undulations 81 tapers from a wavy edge to an apex but the ridges and valleys are parallel to one another. The mold surface for forming the preform blank 80 would have the same multi-wave, parallel undulations shown in FIG. 8.

Figure 9:
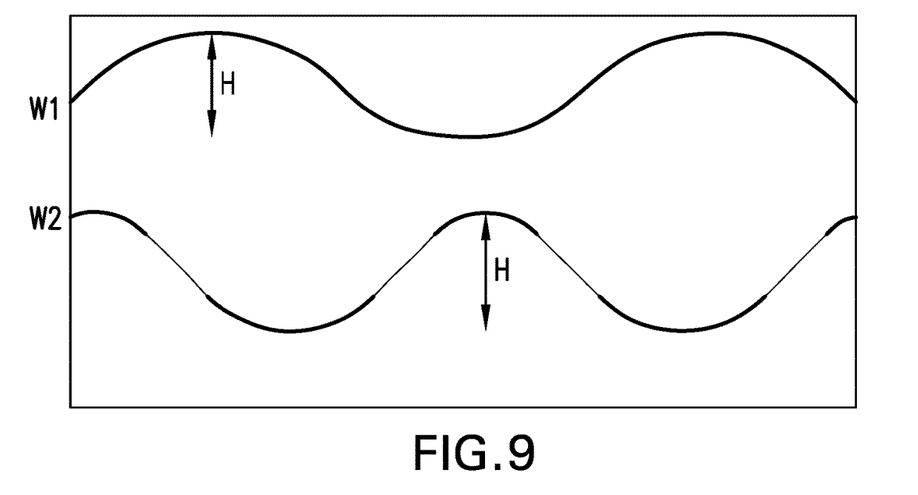
FIG. 9 shows examples of wavy edge profiles for the intermediate preform blank.

The multi-wave undulations on the tool surface described in reference to FIGS. 6-8 may have a wavy edge with configuration, which can be varied based in the properties of the compaction roller in the ATL/AFP device. FIG. 9 shows two possible wave configurations W1 and W2 as examples for the wavy edge profile of the mold surface on which the blank is formed. Referring to FIG. 9, the height (H) of the peaks in the wave and the distance between peaks may be varied based on the cross-sectional diameter and softness of the compaction roller. As an example, the height (H) may be up to 10 mm when the compaction roller has a 20 shore hardness and 68 mm diameter.

Figure 10:
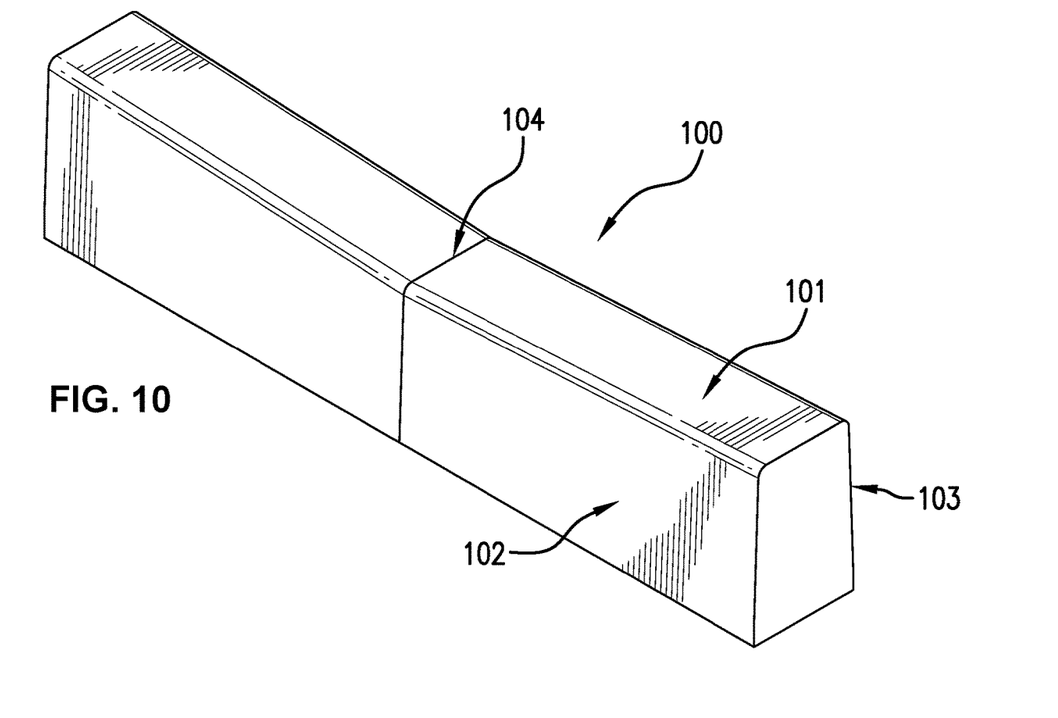
FIG. 10 shows the molding tool for shaping the intermediate preform blank.

The intermediate preform blank (which may be any one shown in FIGS. 2, 6 and 8) is subsequently shaped into the final 3D preform shown in FIG. 1 using a molding tool shown in FIG. 10. Referring to FIG. 10, the molding tool 100 for shaping the intermediate preform blank has a non-planar top surface 101 extending along the length dimension of the tool and two contiguous side walls 102, 103. The top surface 101 of tool 100 has a bent line or valley 104 defined by two sloping surface areas, each sloping surface area inclining downward from one end of the top surface toward the middle. The bent line/valley 104 is formed where the sloping surface areas meet. The sidewalls 102 and 103 extend along the longitudinal length of the tool 100. In some embodiments, the sidewalls do not have any curved wall section or curved surface.

Figure 11:
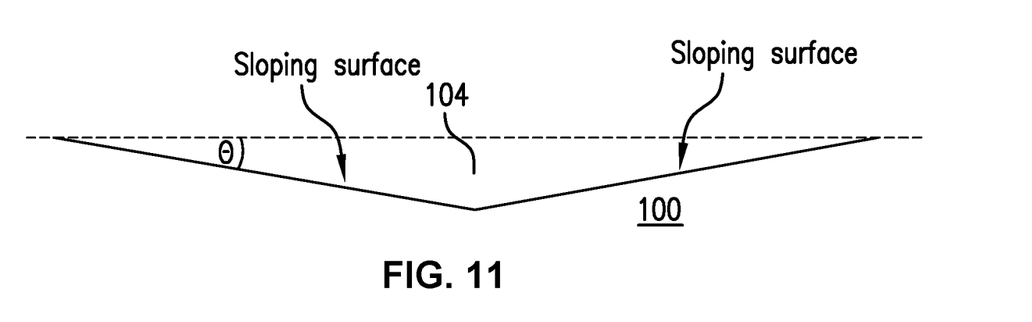
FIG. 11 shows the top surface profile of the molding tool shown in FIG. 10.

FIG. 11 shows the side-view profile of the top surface 101. The top surface 101 is composed of two sloping surface areas, each forming an angle $\theta$ relative to a planar plane as illustrated by FIG. 11. As examples, the angle $\theta$ may be in the range of 1 to 10 degrees.

Figure 12:
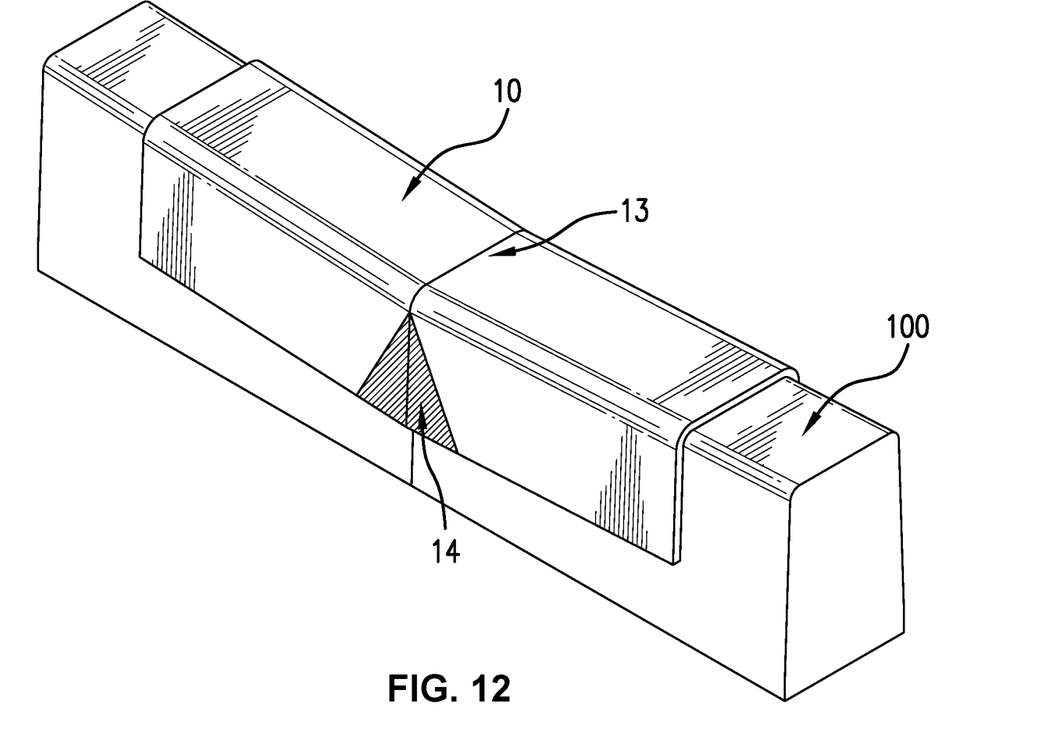
FIG. 12 shows a preform being shaped on the molding tool of FIG. 10.

FIG. 12 shows the shaped preform 10 conforming to the shape of the molding tool 100, wherein the triangular area 14 represents the non-planar portion of the preform which was previously the single-wave undulation or the fan-shaped multi-wave undulations in the intermediate preform blank. The triangular area 14 is adjacent to the "kink" 13 of preform 10. The undulations that were in the intermediate preform blank flatten out when the preform blank conforms to the shape of the molding tool 90. The shaping of preform 10 on the molding tool 100 may be carried out by thermoforming, which includes the application of heat and pressure. Thermoforming can be carried out in a variety of methods such as hot drape forming using a flexible diaphragm to enclose the preform and mold, and applying vacuum, or mechanically shaping by heated surfaces.

The shaped preform is configured for receiving liquid resin via RTM or VARTM processes. The preform may be trimmed to fit in the RTM molding tool. During RTM, the preform is heated under vacuum inside the tool to a temperature suitable for the resin's viscosity, reactivity and pot life. The resin is injected into the tool under pressure. The tool is heated at a rate to a temperature for a time appropriate for the resin to cure. Once cured, the resin-infused preform is cooled and removed from the tool, resulting in a hardened composite part. The composite part is then trimmed, optionally drilled, and finished (e.g., painted or roughened to receive adhesive) as desired by the manufacturer. The process for VARTM is similar except the tool is open on one side, and a conformable vacuum bag is used to enclose the tool. RTM and VARTM tools may have integrated heaters or they can be heated inside an oven or an autoclave.

Fiber Tapes

The fiber tapes for use in the automated placement method described above have a continuous length and a narrow width, for example, the width may be ⅛ in to 1.5 in (or 3.17 mm-38.1 mm), particularly, ¼ in to ½ in (or 6.35 mm-12.77 mm), which is typical for AFP. The fiber tapes may have a wider width, for example, 6 in to 12 in (or 152 mm-305 mm), which is typical for ATL.

Unlike conventional pre-impregnated tape (or prepreg), the fiber tape for forming the preform is substantially resin-free except for a small amount of binder, which is sufficient to hold the fibers together. The total content of binder in the fiber tape may be about 15% or less by weight, for example, between 0.1 and 15% by weight, based on the total weight of the fiber tape. The fibers constitute the major component of the fiber tape or fabric ply, e.g. greater than 80% by weight based on the total weight of the fiber tape.

In one embodiment, the fiber tape is composed of a layer of unidirectional fibers laminated to a nonwoven veil at least on one side. "Unidirectional" fibers refer to fibers aligning parallel to each other in the same direction. The unidirectional fibers are high-strength reinforcement fibers such as carbon fibers, graphite fibers, glass fibers, ceramic fibers, and aramid fibers. The nonwoven veil may comprise thermoplastic fibers, carbon fibers, or a combination thereof. The fibers of the veil may be randomly oriented or not depending on the veil manufacturing process conditions. In some embodiments, the areal weight of the nonwoven veil is 10 gsm or less. Alternatively, the nonwoven veil may be in the form of a thermoplastic grid or a porous, thermoplastic membrane with a controlled pattern of apertures. The openness of the nonwoven veil (whether in the form of random fibers, grid or porous membrane) is configured to ease air removal and resin flow during the resin infusion process. When the thermoplastic veil is used, it also functions as a binder for holding the unidirectional fibers in place and will soften by heating during the automated placement method disclosed herein.

In one embodiment, the fiber tape is composed of a nonwoven carbon veil laminated to one side of a layer of unidirectional carbon fibers, and contains a binder composition in an amount sufficient for holding the veil and unidirectional fibers in place.

For embodiments in which the nonwoven carbon veil(s) is/are laminated to the unidirectional fibers, a binder, particularly a liquid binder, can be applied during the fabrication of the fiber tape to enhance the cohesiveness of the reinforcement structure. Moreover, during the fabrication of the fiber tape, a binder can be applied to enhance the bonding of the veil(s) to the unidirectional fibers. The binder(s) in the fiber tape may be selected from the binder materials discussed above for the binder applied onto the disposable layer. If the nonwoven veil(s) is a sheet or randomly arranged fibers, such veil contains a small amount of binder that was added during the manufacturing of the veil. Examples of binders that may be present in the veil include poly vinyl alcohol (PVA), polyester, cross-linked polyester, polystyrene, acrylic, polyphenol, polyurethane, and their copolymers and combinations thereof.

Additional details for the fabrication of fiber tapes comprising nonwoven veils laminated to unidirectional fibers, including the types of binders used during fabrication, may be found in the published application US 2015/375461 with the publication date of Dec. 31, 2015.

Prepreg Tapes

Instead of elongated fiber tapes, the intermediate preform blank described above can be fabricated using elongated prepreg tapes. Each prepreg tape is a strip of composite material composed of reinforcement fibers impregnated with a resin or polymeric material. The reinforcement fibers may be unidirectional carbon fibers impregnated with a thermosetting resin composition that will harden upon curing or embedded within a thermoplastic matrix that can be moulded with heat into the desired shape. The term "unidirectional" refers to alignment in one direction. In the present embodiment, RTM/VARTM will not be carried out after the intermediate preform blank has been shaped on the molding tool 100 as shown in FIG. 12 since the blank is formed of prepreg tapes that are already impregnated with the matrix resin. The shaped composite material on the molding tool is in its final shape but uncured. As such, after the intermediate preform blank is shaped on the molding tool as shown in FIG. 12, the shaped composite material is subsequently cured to form a hardened composite structure.

The invention claimed is:

1. A method for producing a three-dimensional fibrous preform having side flanges, comprising:
   (a) forming an intermediate preform blank by automatically laying up plural layers of fibrous material on a mold surface having surface contours, said preform blank having a length, two opposing longitudinal side edges along the length dimension, and two non-planar portions along the longitudinal side edges; and
   (b) shaping the intermediate preform blank on a molding tool having a length, a non-planar surface along the length dimension, and two contiguous sidewalls for forming flanges, such that the intermediate preform blank conforms to the non-planar surface and the sidewalls of the molding tool, thereby forming a three-dimensional preform with a non-planar surface and two opposing side flanges,
   wherein the three-dimensional preform is porous and permeable to liquid,
   wherein the intermediate preform blank at (a) is mostly flat except for the two non-planar portions along the longitudinal side edges, each non-planar portion (i) tapers from a wavy edge portion to an apex and comprises multiple ridges and valleys that are parallel to each other or (ii) comprises multiple ridges and valleys that taper smoothly from a wavy edge portion to an apex, the edge portion of each non-planar portion is located at an intermediary position along each longitudinal side edge, and the apexes of the two non-planar portions are pointing toward each other,
   wherein each layer of fibrous material is formed at (a) by an automated placement process, which comprises depositing a plurality of elongated fiber tapes side-by-side and consolidating the elongated fiber tapes using a compaction roller,
   wherein each elongated fiber tape comprises a nonwoven veil laminated to at least one side of a layer of unidirectional fibers, said nonwoven veil comprising randomly arranged fibers selected from thermoplastic fibers, carbon fibers, or a combination thereof,
   wherein the surface contours of the mold surface at (a) comprise ridges and valleys that correspond to the ridges and valleys of the non-planar portions in the intermediate preform blank,
   wherein the height of the ridges in the surface contours of the mold surface and the distance between the ridges are determined based on the cross-sectional diameter and softness of the compaction roller, and
   wherein the non-planar surface of the molding tool at (b) has a bent line (or valley) defined by two sloping surfaces, each sloping surface inclining from one end of the molding tool toward the middle.

2. The method according to claim 1, wherein the sidewalls of the molding tool do not comprise any curved surface.

3. The method according to claim 1, wherein the shaped three-dimensional preform has a U-shaped cross-section.

4. The method according to claim 1, wherein each non-planar portion tapers from a wavy edge portion to an apex and comprises multiple ridges and valleys that are parallel to each other.

* * * * *